United States Patent
Zhang et al.

(10) Patent No.: US 11,250,701 B2
(45) Date of Patent: Feb. 15, 2022

(54) DATA TRANSFER LOGIC FOR TRANSFERRING DATA BETWEEN SENSORS AND PLANNING AND CONTROL OF AN AUTONOMOUS DRIVING VEHICLE

(71) Applicants: BAIDU.COM TIMES TECHNOLOGY (BEIJING) CO., LTD., Beijing (CN); Baidu USA LLC, Sunnyvale, CA (US)

(72) Inventors: Manjiang Zhang, Sunnyvale, CA (US); Xiangtao You, Santa Clara, CA (US); Davy Huang, San Jose, CA (US); Tiffany Zhang, San Jose, CA (US); Shuai Wang, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 586 days.

(21) Appl. No.: 16/099,862

(22) PCT Filed: Aug. 24, 2018

(86) PCT No.: PCT/CN2018/102298
§ 371 (c)(1),
(2) Date: Nov. 8, 2018

(87) PCT Pub. No.: WO2020/037663
PCT Pub. Date: Feb. 27, 2020

(65) Prior Publication Data
US 2021/0225167 A1    Jul. 22, 2021

(51) Int. Cl.
G08G 1/09 (2006.01)
B60W 60/00 (2020.01)
B60W 10/04 (2006.01)
G01S 19/42 (2010.01)
(Continued)

(52) U.S. Cl.
CPC ............. *G08G 1/091* (2013.01); *B60W 10/04* (2013.01); *B60W 10/18* (2013.01); *B60W 10/20* (2013.01);
(Continued)

(58) Field of Classification Search
USPC .......................................................... 701/25
See application file for complete search history.

(56) References Cited

U.S. PATENT DOCUMENTS

| | | |
|---|---|---|
| 5,007,042 A | 4/1991 | Santi |
| 5,664,139 A | 9/1997 | Spurlock |
| (Continued) | | |

FOREIGN PATENT DOCUMENTS

KR    20150071419    6/2015

*Primary Examiner* — Tyler D Paige
(74) *Attorney, Agent, or Firm* — Womble Bond Dickinson (US) LLP

(57) ABSTRACT

In one embodiment, a sensor unit to be utilized in an autonomous driving vehicle (ADV) includes a sensor interface that can be coupled to a number of sensors mounted on a number of different locations of the ADV. The sensor unit further includes a host interface that can be coupled to a host system such as a planning and control system utilized to autonomously drive the vehicle. The sensor unit further includes a number of data transfer modules corresponding to the sensors. Each of the data transfer modules can be configured to operate in one of the operating modes, dependent upon the type of the corresponding sensor. The operating modes include a low latency mode, a high bandwidth mode, and a memory mode.

20 Claims, 11 Drawing Sheets

(51) Int. Cl.
    *H04W 4/48*       (2018.01)
    *H04L 29/08*     (2006.01)
    *B60W 30/10*     (2006.01)
    *B60W 10/18*     (2012.01)
    *B60W 10/20*     (2006.01)
    *G08G 1/00*      (2006.01)

(52) U.S. Cl.
    CPC ........... *B60W 60/001* (2020.02); *G01S 19/42* (2013.01); *G08G 1/20* (2013.01); *B60W 2420/42* (2013.01); *B60W 2420/52* (2013.01); *B60W 2556/50* (2020.02); *H04L 67/12* (2013.01)

(56) References Cited

U.S. PATENT DOCUMENTS

| | | | |
|---|---|---|---|
| 10,816,979 B2 * | 10/2020 | Zhang | G06T 7/0002 |
| 10,890,914 B2 * | 1/2021 | Zhang | G01S 7/484 |
| 2010/0106356 A1 * | 4/2010 | Trepagnier | G08G 1/16 |
| | | | 701/25 |
| 2015/0081998 A1 | 3/2015 | Post et al. | |
| 2015/0244826 A1 * | 8/2015 | Stenneth | H04L 67/322 |
| | | | 709/213 |
| 2015/0331422 A1 * | 11/2015 | Hartung | G05D 1/021 |
| | | | 701/23 |
| 2018/0174023 A1 * | 6/2018 | Imam | G06N 3/049 |
| 2018/0232947 A1 * | 8/2018 | Nehmadi | G01S 17/931 |
| 2019/0138007 A1 * | 5/2019 | Baghsorkhi | G08G 1/091 |
| 2019/0258878 A1 * | 8/2019 | Koivisto | G05D 1/00 |
| 2019/0364492 A1 * | 11/2019 | Azizi | H04W 52/0264 |
| 2019/0384303 A1 * | 12/2019 | Muller | G06K 9/00791 |
| 2020/0064836 A1 * | 2/2020 | Zhang | G05D 1/028 |

\* cited by examiner

DATA TRANSFER LOGIC FOR TRANSFERRING DATA BETWEEN SENSORS AND PLANNING AND CONTROL OF AN AUTONOMOUS DRIVING VEHICLE

TECHNICAL FIELD

Embodiments of the present disclosure relate generally to operating autonomous vehicles. More particularly, embodiments of the disclosure relate to a sensor system of an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control depends heavily on the sensors of the vehicle. Different sensors may have different requirements or specifications. Given the limited resources on the hardware, there has been a lack of efficient sensor processing units that can process different types of sensors efficiently.

BRIEF DESCRIPTION OF THE DRAWINGS

Embodiments of the disclosure are illustrated by way of example and not limitation in the figures of the accompanying drawings in which like references indicate similar elements.

SUMMARY

Figure 1:
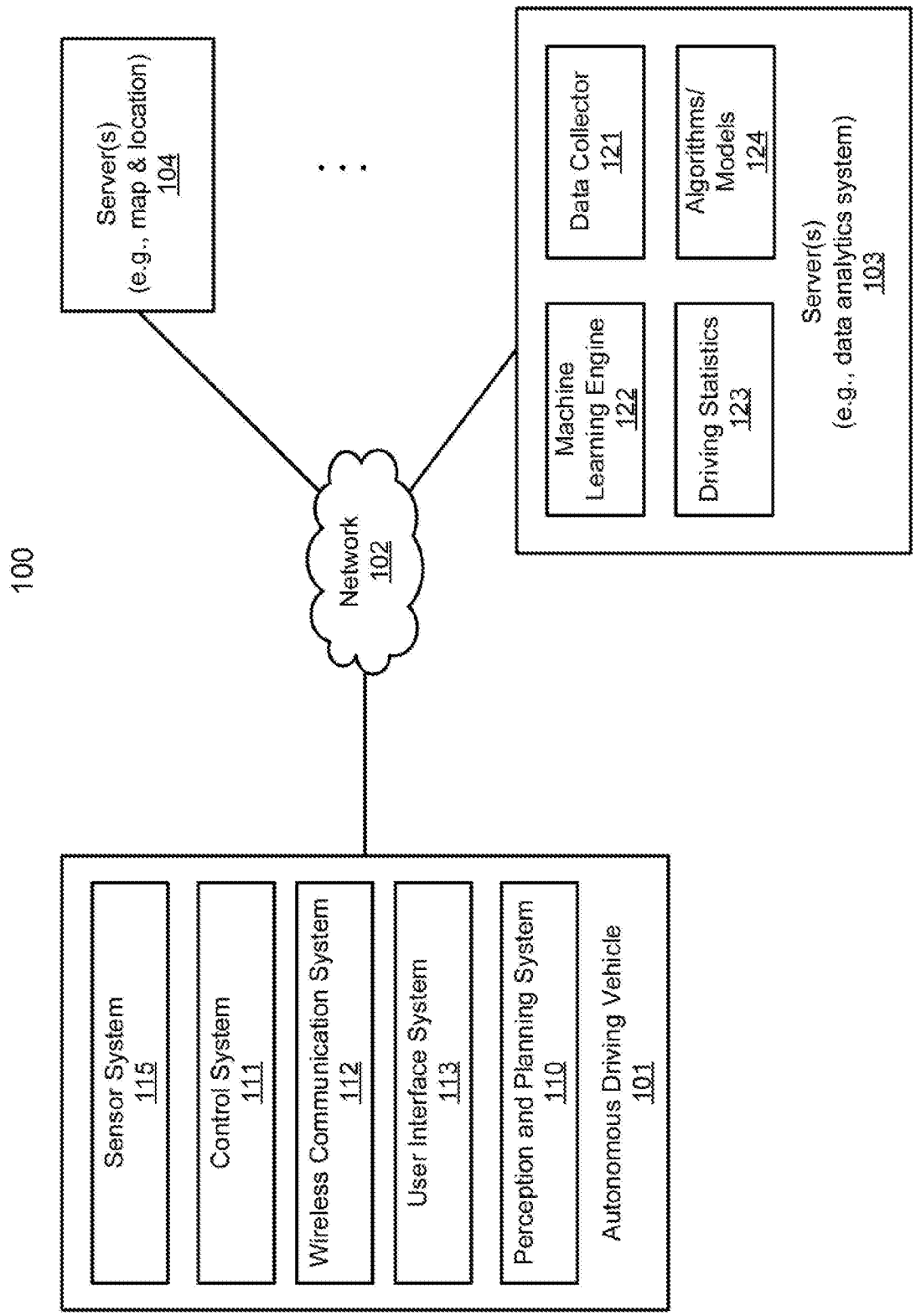
FIG. 1 is a block diagram illustrating a networked system according to one embodiment.

In a first aspect, the present disclosure provides a sensor unit utilized in an autonomous driving vehicle, the sensor unit comprising: a sensor interface to be coupled to a plurality of sensors mounted on a plurality of locations of an autonomous driving vehicle (ADV); a host interface to be coupled to a host system, wherein the host system is configured to perceive a driving environment surrounding the ADV based on sensor data obtained from the sensors and to plan a path to autonomously drive the ADV; and a plurality of data transfer modules corresponding to the plurality of sensors, wherein each of the data transfer modules is capable of being configured to operate in one of a plurality of operating modes to transfer data between a corresponding sensor and the host system, dependent upon a type of the corresponding sensor, the operating modes including a low latency mode and a high bandwidth mode.

In a second aspect, the present disclosure provides an autonomous driving system, comprising: a plurality of sensors mounted on a plurality of locations of an autonomous driving vehicle (ADV); a host system having a perception module and a planning and control module, wherein the perception module is to perceive a driving environment surrounding the ADV based on sensor data obtained from the sensors, and wherein the planning and control module is to plan a path to autonomously drive the ADV; and a sensor unit coupled to the plurality of sensors and the host system, wherein the sensor unit comprises a sensor interface to be coupled to the plurality of sensors mounted on the ADV, a host interface to be coupled to the host system, and a plurality of data transfer modules corresponding to the plurality of sensors, wherein each of the data transfer modules is capable of being configured to operate in one of a plurality of operating modes to transfer data between a corresponding sensor and the host system, dependent upon a type of the corresponding sensor, the operating modes including a low latency mode and a high bandwidth mode.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect of the disclosure, a sensor unit to be utilized in an autonomous driving vehicle (ADV) includes a sensor interface that can be coupled to a number of sensors mounted on a number of different locations of the ADV. The sensor unit further includes a host interface that can be coupled to a host system such as a planning and control system utilized to autonomously drive the vehicle. The sensor unit further includes a number of data transfer modules corresponding to the sensors. Each of the data transfer modules can be configured to operate in one of different operating modes, dependent upon the type of the corresponding sensor. The operating modes may include a low latency mode, a high bandwidth mode, and a memory mode.

In one embodiment, when operating in a low latency mode, a data transfer module is configured to transfer data with no delay or minimum delay. When operating in a high bandwidth mode, a data transfer module is configured to accumulate the data up to a predetermined amount before sending the accumulated data in a batch to the host system to maximize the bandwidth of the connection between the sensor unit and the host system, similar to a burst mode. The amount of accumulated data is subject to the available bandwidth of the connection that can be transferred within a single transfer cycle or a minimum number of transfer cycles. For example, if the connection is a peripheral component interconnect (PCI) express (PCIe) link, the amount of accumulated data is up to the amount that the PCIe link can handle within a single PCI cycle or a limited number of PCI cycles. In another embodiment, a data transfer module can be configured to operate in a memory mode (also referred to as a fixed memory mode), which directly accesses a mapped memory that is mapped from a system memory of the host system.

According to one embodiment, when transferring data from a sensor to the host system in a low latency mode or a high bandwidth mode, a data transfer module is configured to send a request to the host system for retrieving a page directory table (PDT) that has been configured by the host system to receive data from the sensor. The PDT includes a number of page table (PT) entries. Each PT entry stores a memory address referencing to a page table. Each page table includes a number of memory page entries. Each memory page entry is utilized to store a memory address of a memory page of the host system. Based on the page directory table received from the host, the data transfer module is configured to store the sensor data in the memory pages by traversing through the page directory table and the page tables. By mapping using a page directory table and page tables, the memory pages do not have to be continuous or contiguous. The data transfer can be performed in a scatter gather manner.

According to another embodiment, when transferring data or commands from the host system to a sensor in a low latency mode or a high bandwidth mode, a data transfer module is configured to send a request to the host system for retrieving a descriptor buffer. The descriptor buffer includes a number of entries or blocks. Each entry includes information specifying a start memory address of a memory block or buffer and the size of the memory block of a host memory of the host system. The data transfer module then traverses the descriptor buffer to retrieve the data or commands from the memory block(s) stored by the host system and transmits the data or commands to the corresponding sensor.

According to another aspect, an autonomous driving system includes a number of sensors mounted on different locations of an ADV and a host system. The host system includes a perception module and a planning and control module. The perception module is configured to perceive a driving environment surrounding the ADV based on sensor data obtained from the sensors. The planning and control module is to plan a path to autonomously drive the ADV based on perception data. The autonomous driving system further includes a sensor unit coupled to the sensors and the host system. The sensor unit includes a sensor interface coupled to the sensors mounted on the ADV, a host interface coupled to the host system, and a number of data transfer modules corresponding to the sensors. Each of the data transfer modules is capable of being configured to operate in one of the operating modes to transfer data between a corresponding sensor and the host system, dependent upon a type of the corresponding sensor. The operating modes include a low latency mode and a high bandwidth mode.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
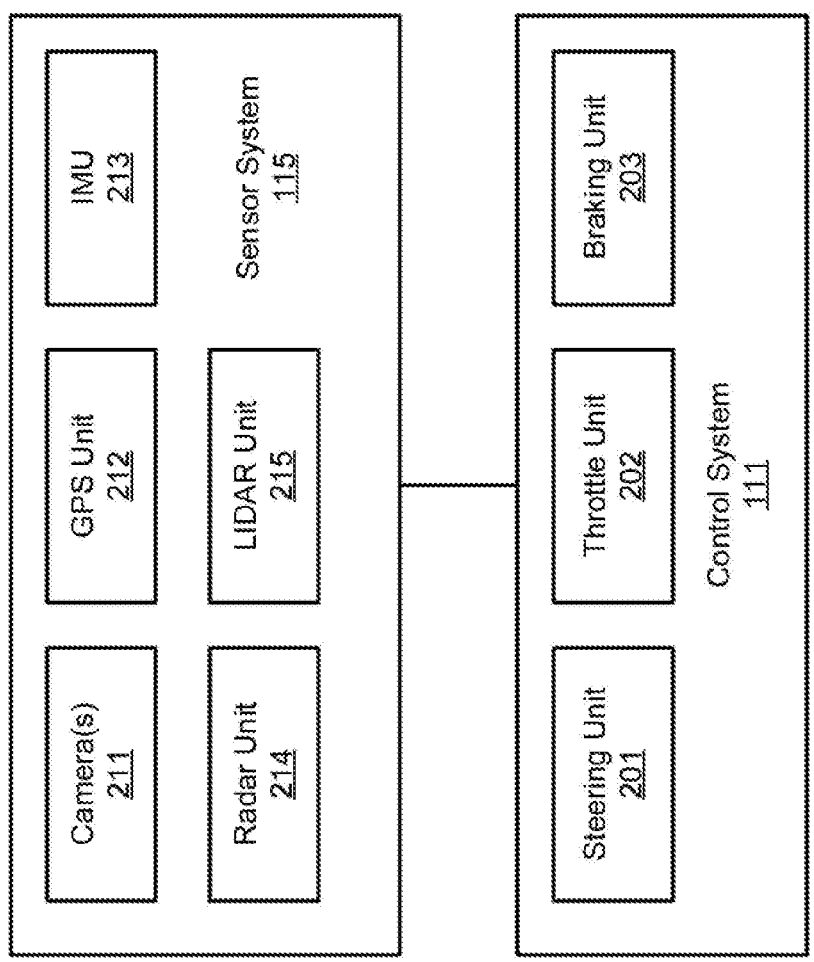
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

Figure 3A:
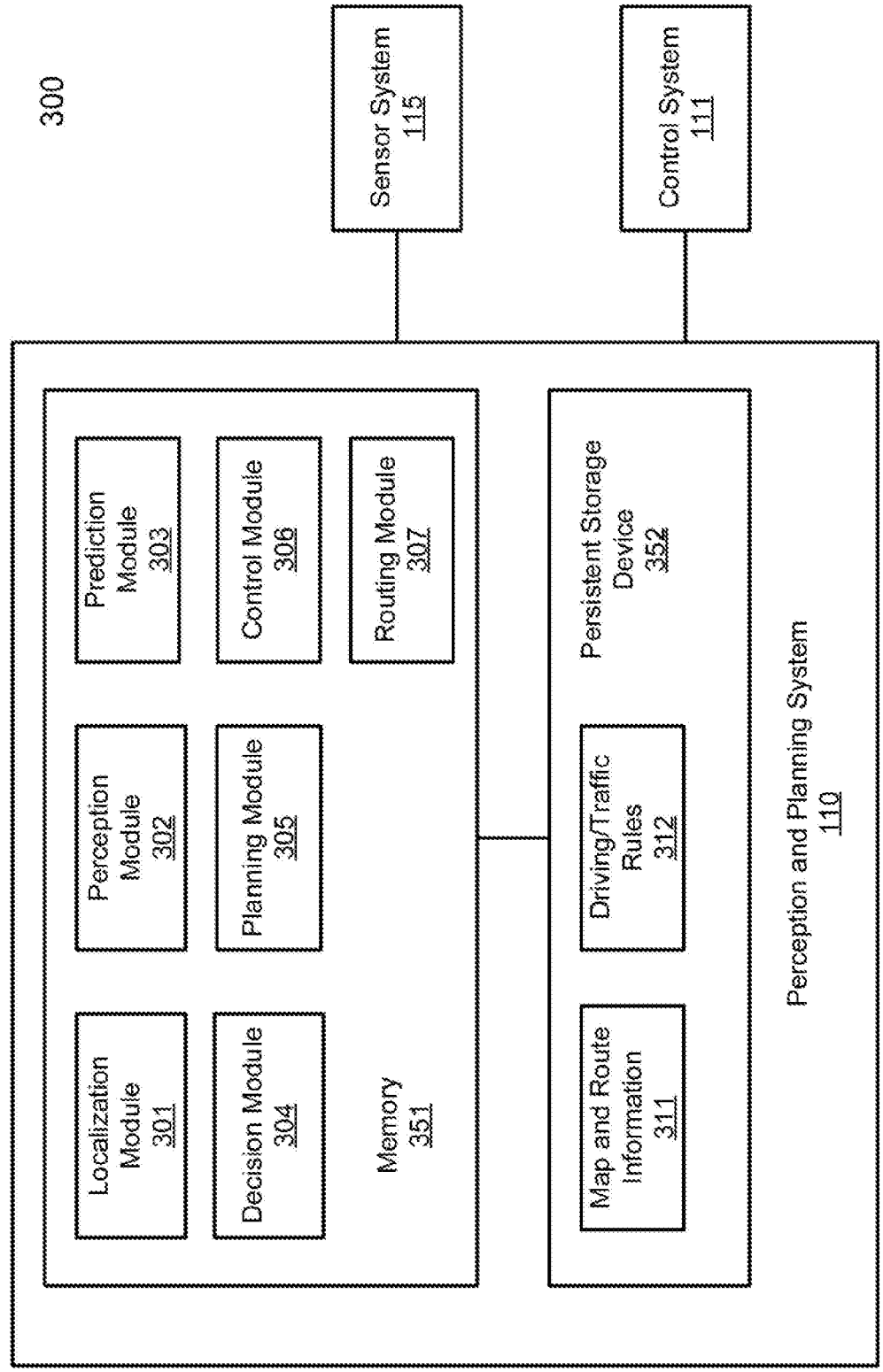
FIGS. 3A-3B are block diagrams illustrating an example of a perception and planning system used with an autonomous vehicle according to one embodiment.
Figure 3B:
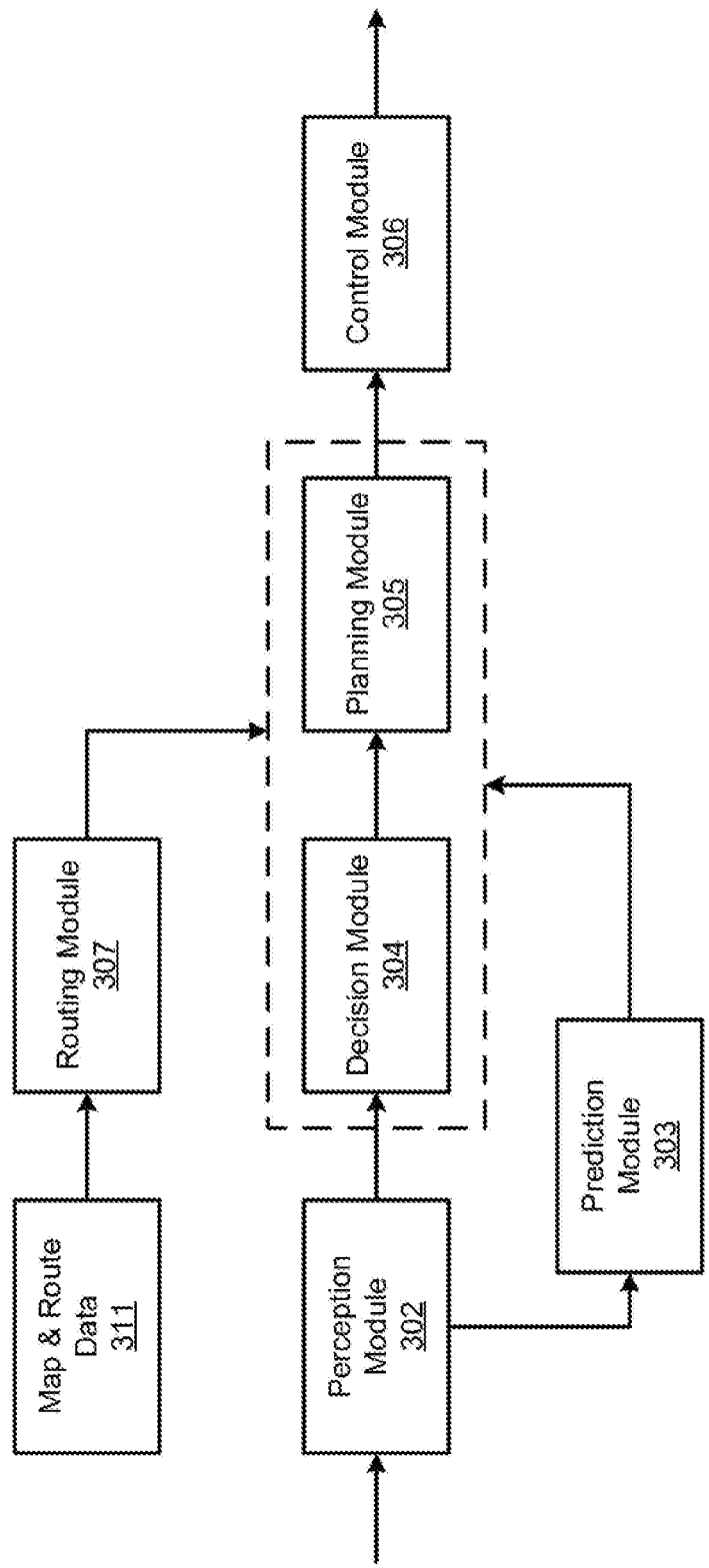

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
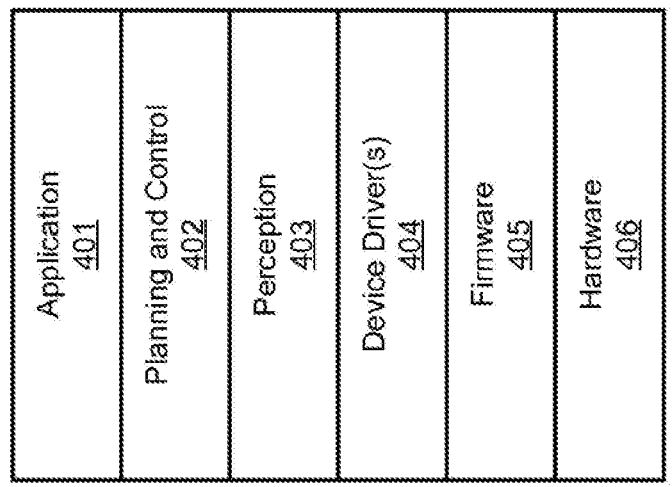
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
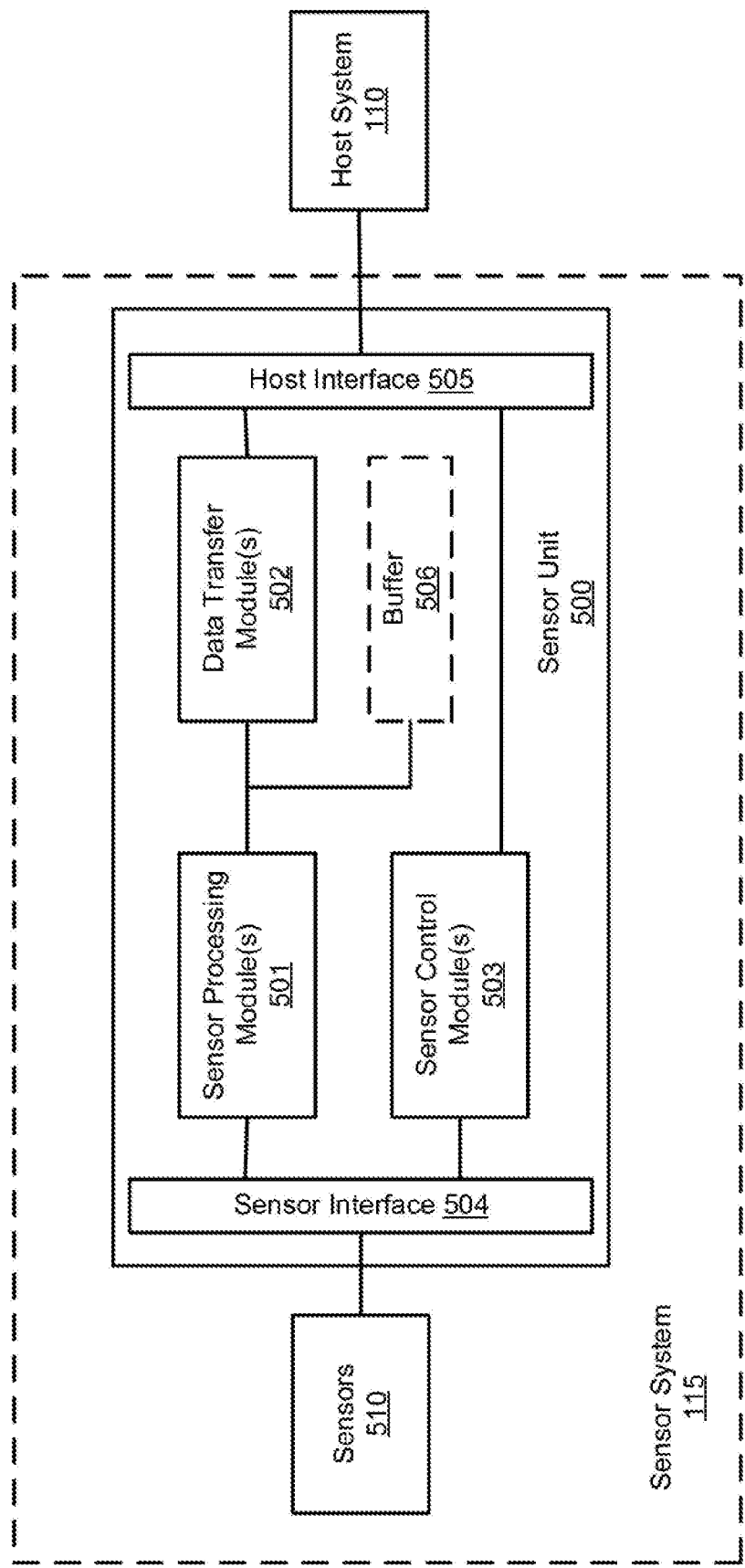
FIGS. 5A and 5B are block diagrams illustrating an example of a sensor unit according to one embodiment.

FIG. 5A is a block diagram illustrating an example of a sensor system according to one embodiment of the disclosure. Referring to FIG. 5A, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
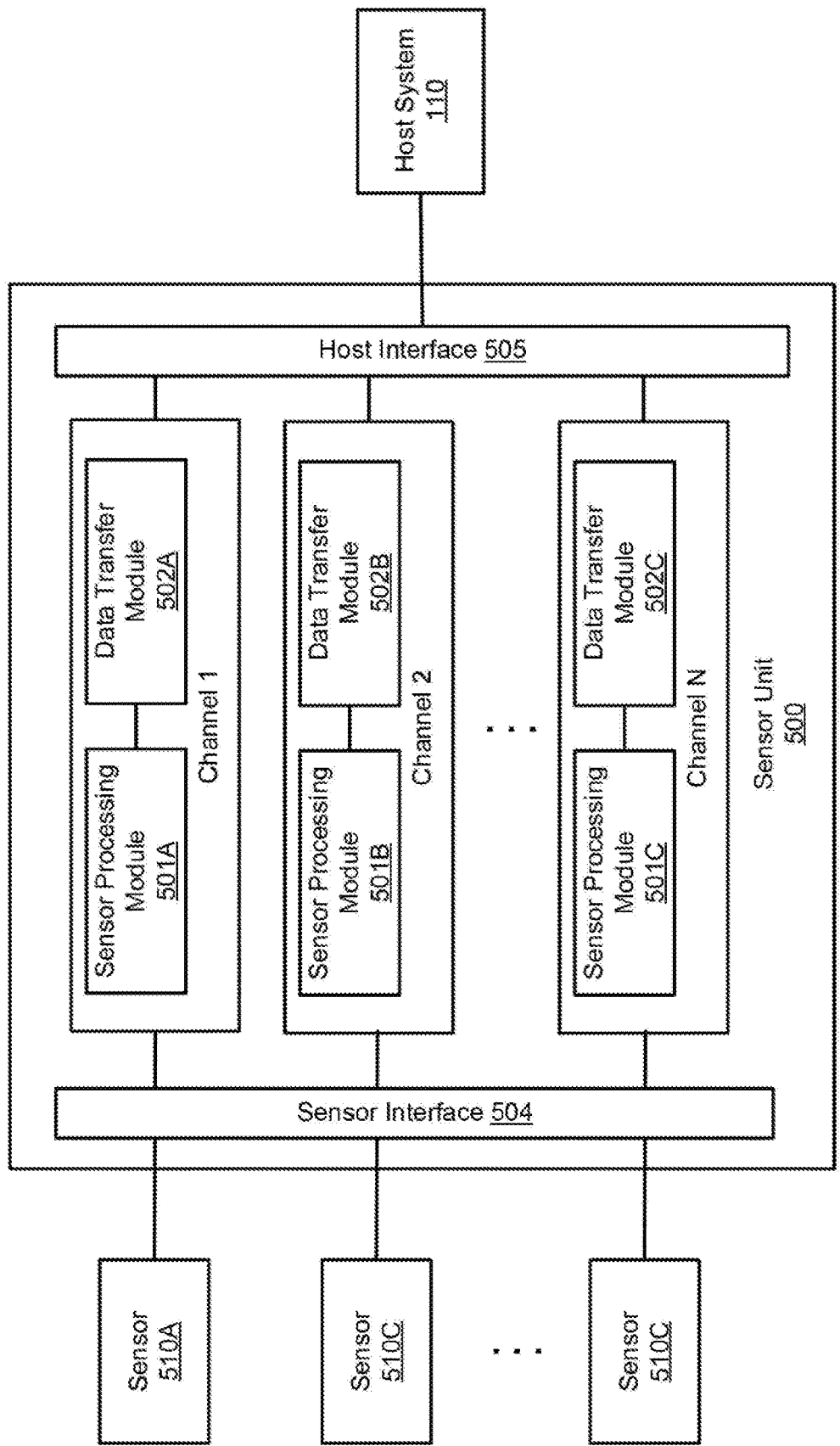

Referring now to FIG. 5B, sensor processing modules 501A-501C are specifically configured to process sensor data obtained from sensors 510A-510C respectively. Note that sensors 510A-510C may the same or different types of sensors. Sensor processing modules 501A-501C can be configured (e.g., software configurable) to handle different sensor processes for different types of sensors. For example, if sensor 510A is a camera, processing module 501A can be figured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 502A-502C can be configured to operate in different modes, as different kinds of sensor data may be in different size or sensitivities that require different speed or timing requirement. According to one embodiment, each of data transfer modules 502A-502C can be configured to operate in one of a low latency mode, a high bandwidth mode, and a memory mode (also referred to as a fixed memory mode).

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

Figure 6:
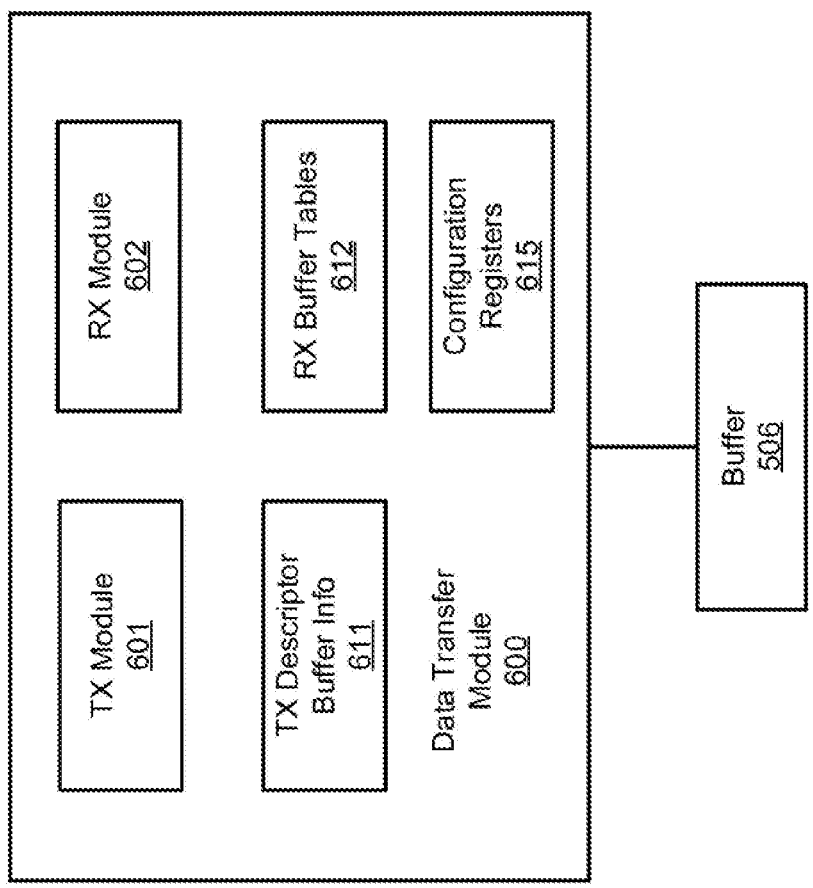
FIG. 6 is a block diagram illustrating an example of a data transfer unit according to one embodiment.

FIG. 6 is a block diagram illustrating a data transfer module according to one embodiment. Data transfer module 600 may represent any of the data transfer modules 502A-502C. Referring to FIG. 6, according to one embodiment, data transfer module 600 includes a transmitting (TX) module 601 and a receiving (RX) module 602. TX module 601 is responsible for transmitting data or commands from host system 110 to a sensor. RX module 602 is responsible for receiving sensor data from a sensor and sending the received sensor data to host system 110.

According to one embodiment, in response to a request to send data and/or commands to a sensor, TX module 601 requests and receives a pointer pointing to a TX descriptor buffer that has been set up by the host system, which may be stored as a part of TX descriptor buffer information 611. The descriptor buffer information includes metadata describing a TX buffer which has been mapped to a host system memory of host system 110. The mapped memory region is configured to store the data and/or commands to be sent to the sensor. In one embodiment, the TX descriptor includes one or more memory block entries. Each memory block entry includes information specifying a starting address of a memory block and a size of the memory block. The data to be sent may be temporarily stored in buffer 506, where the data can be further processed by a corresponding sensor processing module. Alternatively, the sensor processing module can directly process the data from the mapped host memory via the descriptor buffer 611.

Figure 7:
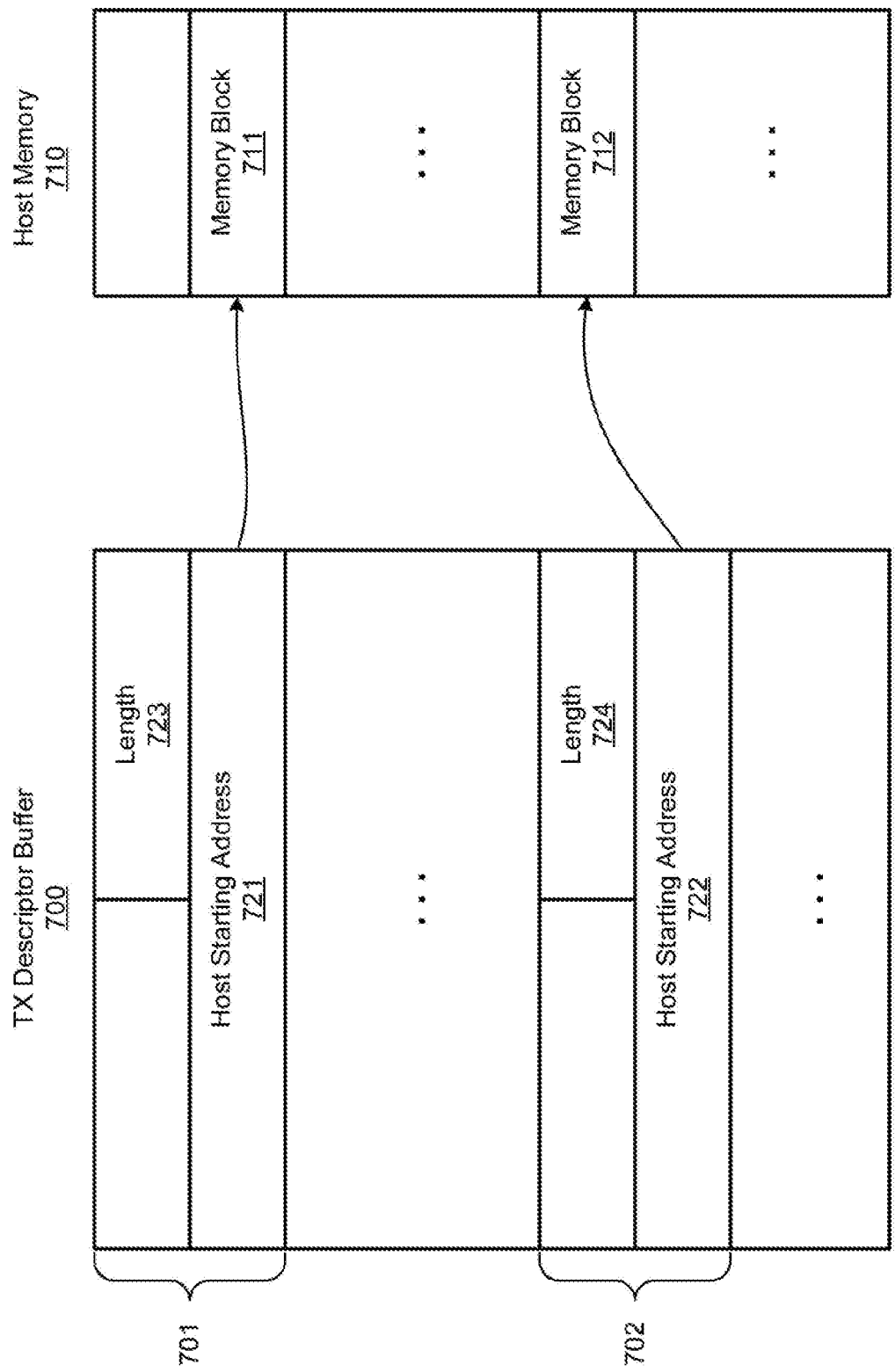
FIG. 7 is a block diagram illustrating an example of a transmitting descriptor buffer according to one embodiment.

FIG. 7 is a block diagram illustrating an example of a transmitting descriptor buffer according to one embodiment. TX descriptor buffer 700 may represent TX descriptor buffer 611 of FIG. 6. Referring to FIG. 7, TX descriptor buffer (also simply referred to as TX descriptor) 700 includes one or more memory block entries 701-702. Each memory block entry includes information specifying a start address of a memory block of host memory 710 of host system 110 such as starting addresses 721-722. Each memory block entry further includes a size or length (e.g., lengths 723-724) of the corresponding memory block. In this example, field 721 stores the starting address of memory block 711 of host memory 710, where the size or length of memory block 711 is specified in field 723. Similarly, field 722 stores the starting address of memory block 712 of host memory 710, where the size or length of memory block 712 is specified in field 724.

Referring to FIGS. 6 and 7, prior to starting data transfer, TX module 601 requests and receives TX descriptor buffer 700 from host system 110. At that point, host system 110 may have already stored the data/commands to be sent in one or more memory blocks 711-712, and populated the fields 721-724 of TX descriptor buffer 700. In response, TX module 601 traverses the TX descriptor buffer 700 to identify memory blocks 711 and 712. TX module 601 then retrieves the data from the memory blocks 711-712 and sends the data to the corresponding sensor processing module, which in turn processes the data to be compatible with the corresponding sensor. Thereafter the data and/or commands are then transmitted to the sensor.

Note that TX descriptor buffer 700 may be downloaded from host system 110 dynamically at run time, in response to a request to transmitting data to a sensor. Alternatively, TX descriptor buffer 700 may be downloaded from host system 110 at the starting of the system, where the memory blocks 711-712 are statically allocated prior to any data transfer.

According to one embodiment, referring back to FIG. 6, when a signal is received indicating that there are sensor data generated from a sensor and may be processed by a corresponding sensor processing module, RX module 602 sends a request to host system 110 to request memory pages to be allocated to receive the data generated from the sensor. RX module 602 then receives RX buffer tables 612 from host system 110. RX buffer tables 612 may include multiple levels (e.g., N levels) of mapping tables. In one embodiment, the top level buffer table includes an RX page directory table. In one embodiment, the RX page directory table includes one or more page table entries. Each page table entry stores a memory address of a particular page table (e.g., a next level table). Each page table entry includes information specifying a start address of a memory page (e.g., a fixed memory page as a next level table) of the host memory of host system 110. There can be N levels of linked tables between the top level table and the memory pages of the host memory of host system 110. Each parent level table includes an address or link referencing to a child level table in an hierarchical structure.

Figure 8:
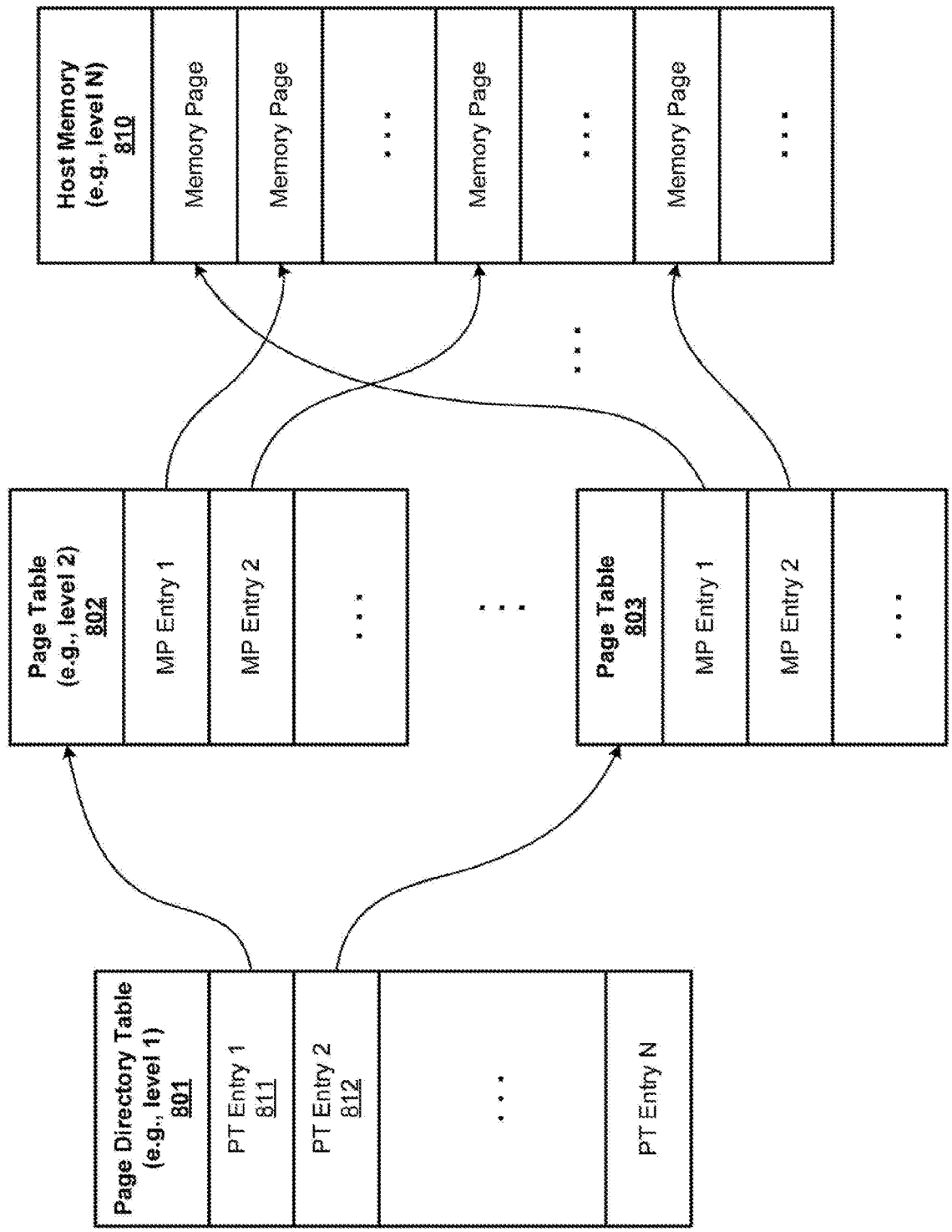
FIG. 8 is a block diagram illustrating an example of receiving buffer tables according to one embodiment.

FIG. 8 is a block diagram illustrating an example of RX buffer table structure according to one embodiment. The page directory table 801 may represent a top level of RX buffer tables 612 of FIG. 6. Referring to FIG. 8, page directory table 801 includes one or more page table (PT) entries such as PT entries 811-812. Each PT entry is utilized to store an address linking with a particular page table such as page tables 802-803 (e.g., a next level table, a child level table of table 801). In this example, PT entry 811 stores an address pointing to page table 802, while PT entry 812 stores an address referencing page table 803. Each page table includes one or more memory page (MP) entries. Each MP entry can be utilized to store or specify a memory address pointing to a starting location of a memory page (e.g., a next level table) in host memory 810. The memory pages may be allocated as a fixed size (e.g., 4 kilobytes or KB) memory page.

Referring to FIGS. 6 and 8, RX module 602 receives page directory table 801 from host system 110, either during the initialization of the system or dynamically in response to a request for receiving sensor data. RX module 602 traverses page directory table 801 to locate one or more of page tables 802-803, and from page tables 802-803, RX module 602 identifies and retrieves the memory addresses of memory pages. Dependent upon the size of sensor data, RX module 602 can retrieve the sensor data from buffer 506, where the sensor data may have been processed by a corresponding sensor processing module. RX module 602 then stores the sensor data in memory pages of host memory 810 based on the starting addresses of the memory pages obtained from page tables 802-803.

In one embodiment, data transfer module 600 may further include a set of one or more configuration registers 615 to store any configuration information, which may be specified by host system 110. For example, if the data does not fill up all of the space of a memory page, the memory address of the last memory location may be specified and stored in configuration registers 615. As a result, the logic to fill in the data or the logic to read the data knows where to wrap around or stop. Although there are only three levels of tables shown in FIG. 8, there can be one or more levels of tables between table 801, 802 and 803, and host memory 810.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
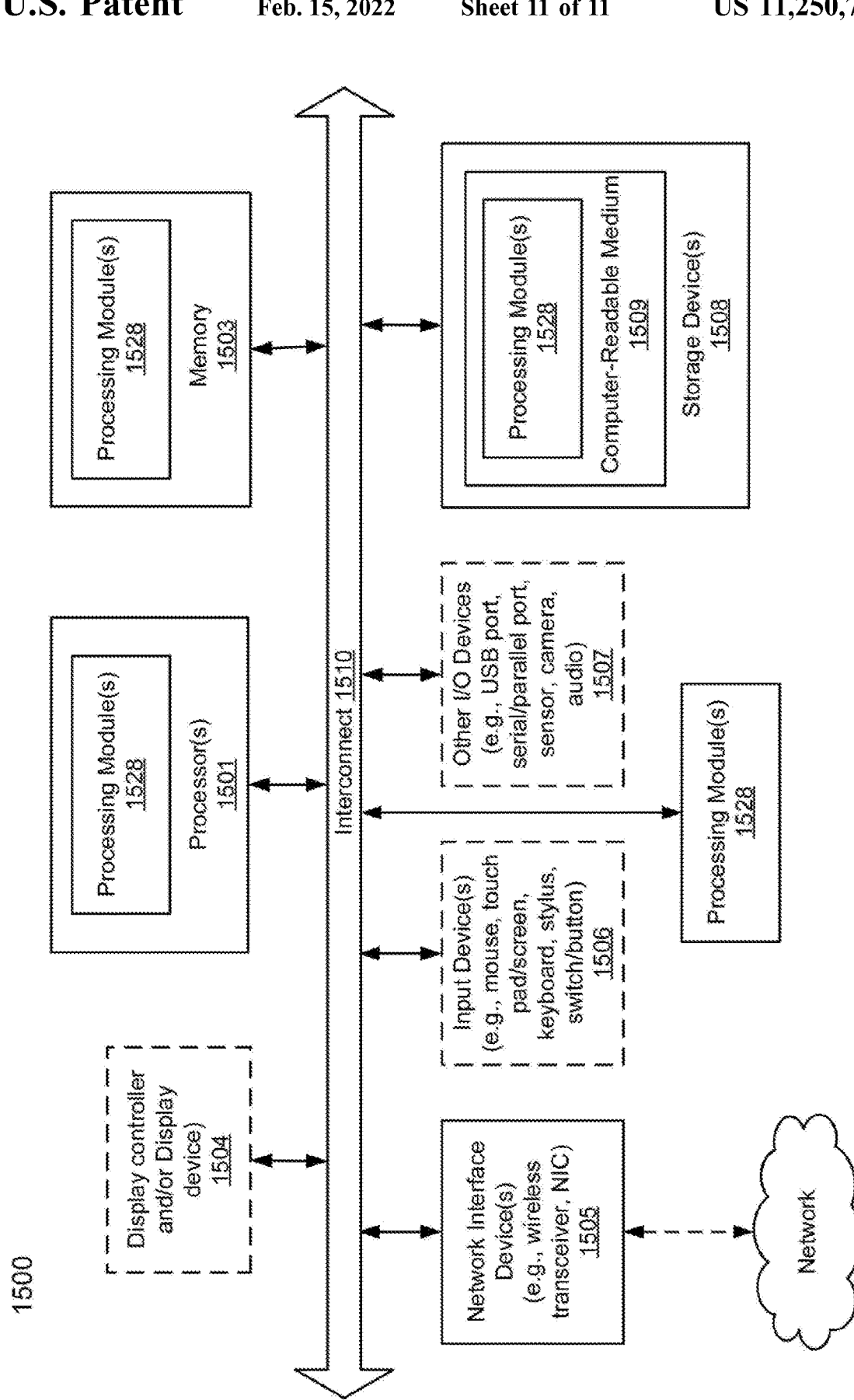
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, perception module 302, planning module 305, control module 306, and/or sensor unit 500. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A sensor unit utilized in an autonomous driving vehicle, the sensor unit comprising:
   a sensor interface to be coupled to a plurality of sensors mounted on a plurality of locations of an autonomous driving vehicle (ADV);
   a host interface to be coupled to a host system, wherein the host system is configured to perceive a driving environment surrounding the ADV based on sensor data obtained from the sensors and to plan a path to autonomously drive the ADV; and
   a plurality of data transfer modules corresponding to the plurality of sensors, wherein each of the data transfer modules is capable of being configured to operate in one of a plurality of operating modes to transfer data between a corresponding sensor and the host system, dependent upon a type of the corresponding sensor, the operating modes including a low latency mode and a high bandwidth mode, wherein a data transfer module operating in the low latency mode satisfies a data transfer timing requirement, wherein a data transfer module operating in the high bandwidth mode accumulates data up to a predetermined amount prior to sending the accumulated data.

2. The sensor unit of claim 1, wherein when operating in the low latency mode, each data transfer module transfers data with a minimum delay.

3. The sensor unit of claim 1, wherein when operating in the high bandwidth mode, the data transfer module is configured to accumulate the data up to a predetermined amount, prior to sending the accumulated data in a burst to the host system to maximize a bandwidth of a connection between the data transfer module and the host system.

4. The sensor unit of claim 3, wherein the connection between the data transfer module and the host system is a peripheral component interconnect express (PCIe) compatible connection.

5. The sensor unit of claim 1, wherein each of the data transfer modules is further capable of being configured to operate in a fixed memory mode.

6. The sensor unit of claim 5, wherein when operating in the fixed memory mode, each data module is configured to directly access a mapped memory of the host system.

7. The sensor unit of claim 1, wherein a first data transfer unit corresponding to a first sensor is configured to
   transmit a request to the host system via the host interface to receive a page directory table (PDT); and
   in response to sensor data received from the first sensor, transmit the sensor to the host system by storing the sensor data in a plurality of memory pages described by the PDT.

8. The sensor unit of claim 7, wherein the PDT comprises a plurality of page table (PT) entries, wherein each of the page table entries is to store a memory address corresponding to one of a plurality of page tables.

9. The sensor unit of claim 8, wherein each page table includes a plurality of memory page entries, wherein each memory page entry stores a memory address of a memory page of the host system.

10. The sensor unit of claim 9, wherein the first data transfer module further comprises one or more configuration registers to receive a number of page table entries in the PDT and a fixed size of memory pages of the host system, which are configured by the host system.

11. The sensor unit of claim 1, wherein a second data transfer unit corresponding to a second sensor is configured to
   receive a request from the host system via the host interface to send data to the second sensor, the request including a descriptor buffer from the host;
   retrieve the data from a data buffer described by the descriptor buffer; and
   transmit the retrieved data to the second sensor via the sensor interface.

12. The sensor unit of claim 11, wherein the descriptor buffer comprises a plurality of data block entries, wherein each data block entry corresponds to one of a plurality of data blocks of the data buffer.

13. The sensor unit of claim 12, wherein each data block entry comprises a length of a corresponding data block and a memory address of the corresponding data block in the data buffer.

14. The sensor unit of claim 1, wherein the sensor interface comprises an Ethernet interface to be coupled with a LIDAR device or one or more cameras.

15. The sensor unit of claim 1, wherein the sensor interface comprises a global positioning system (GPS) interface to be coupled to at least one of a GPS receiver and an IMU device.

16. The sensor unit of claim 1, wherein the sensor interface comprises a control area network (CAN) interface to be coupled to throttle control logic, braking control logic, and steering control logic of the ADV.

17. An autonomous driving system, comprising:
a plurality of sensors mounted on a plurality of locations of an autonomous driving vehicle (ADV);
a host system having a perception module and a planning and control module, wherein the perception module is to perceive a driving environment surrounding the ADV based on sensor data obtained from the sensors, and wherein the planning and control module is to plan a path to autonomously drive the ADV; and
a sensor unit coupled to the plurality of sensors and the host system, wherein the sensor unit comprises
a sensor interface to be coupled to the plurality of sensors mounted on the ADV,
a host interface to be coupled to the host system, and
a plurality of data transfer modules corresponding to the plurality of sensors, wherein each of the data transfer modules is capable of being configured to operate in one of a plurality of operating modes to transfer data between a corresponding sensor and the host system, dependent upon a type of the corresponding sensor, the operating modes including a low latency mode and a high bandwidth mode, wherein a data transfer module operating in the low latency mode satisfies a data transfer timing requirement, wherein a data transfer module operating in the high bandwidth mode accumulates data up to a predetermined amount prior to sending the accumulated data.

18. The system of claim 17, wherein when operating in the low latency mode, each data transfer module transfers data with a minimum delay.

19. The system of claim 17, wherein when operating in the high bandwidth mode, the data transfer module is configured to accumulate the data up to a predetermined amount, prior to sending the accumulated data in a burst to the host system to maximize a bandwidth of a connection between the data transfer module and the host system.

20. The system of claim 19, wherein the connection between the data transfer module and the host system is a peripheral component interconnect express (PCIe) compatible connection.

* * * * *